Sept. 26, 1933.   O. T. McKEAN   1,927,875
OIL FILTER
Filed Jan. 18, 1932
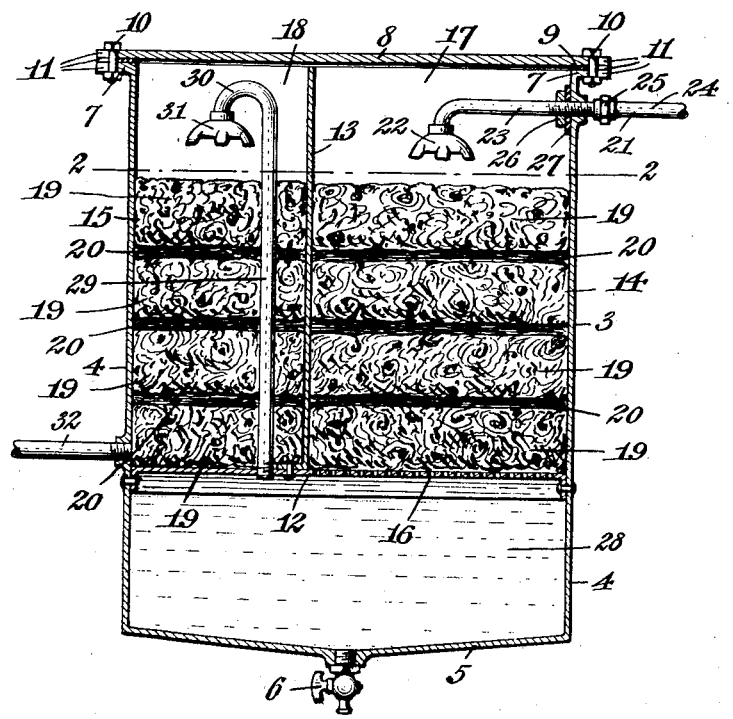
Oliver Teatric McKean, Inventor.
By Emil Neuhart
Attorney.

Patented Sept. 26, 1933

1,927,875

UNITED STATES PATENT OFFICE 1,927,875

OIL FILTER

Oliver Teatric McKean, Buffalo, N. Y.

Application January 18, 1932. Serial No. 587,178

5 Claims. (Cl. 210—135)

My invention relates to improvements in oil filters, it being of a type capable of being manufactured in various sizes, but being particularly designed for use in filtering or purifying oil in automobiles.

Oil filters, or what are often termed "oil purifiers", used to filter oil within an automobile, are constructed in a manner to prevent cleansing of the same, and since they become "loaded" after a short period of use, by which term I mean filled with fine particles of metal, grit, and other foreign matter, they are a continual expense owing to the necessity of replacing them with new. Inexperienced owners of automobiles, however, assume replacements of the filters to be unnecessary, and consequently after they are loaded with foreign matter and continued to be used, the pressure under which the oil is forced through the filter loosens the foreign matter in the filter and forces it out into the oil, with the result that the oil, instead of being purified or freed of foreign matter, will become loaded with foreign matter and be less effective than if not filtered at all.

It is one of the objects of my invention to provide an improved oil filter of simple and inexpensive construction, and one which will give maximum efficiency.

Another object of my invention is to provide a filter with which double filtering action is assured, and from which the filtering medium can be quickly and conveniently removed in order to free the same of foreign matter.

A further object of my invention is the provision of a filter adapted for use in filtering oil under pressure, and in which alternate layers of different filtering materials are employed so that an effective filtering action is assured, such layers being preferably natural sponge and camels hair alternately arranged, these particular substances possessing especially good filtering qualities.

Another object of my invention is the provision of a filter for filtering oil under pressure, which involves the use of at least two filtering chambers provided with filtering mediums and through which the oil under pressure is caused to move in a downward direction so that during the action of filtering, the oil is aided in its course by gravity in addition to pressure.

With the above and other objects to appear hereinafter, my invention consists in the novel features of construction, and in the arrangement and combination of parts to be hereinafter described and more particularly pointed out in the subjoined claims.

In the drawing:

Fig. 1 is a central vertical section through a filter constructed in accordance with my invention in the form it is now considered most practical, Fig. 2 is a horizontal section taken on line 2—2, Fig. 1.

The filter includes a casing 3, which although shown as of rectangular formation, may be constructed in any other form, if desired.

The casing comprises the side walls 4, a bottom wall 5 inclined from the side walls to the center, at which point a pet cock 6 or other suitable outlet control is provided, said outlet control serving as a drain, as will appear hereinafter. The upper end of the casing proper is open and the walls thereof are provided at their upper end with an outstanding flange 7. A cover 8 is applied to this upper end, and between the cover and the flange 7 a gasket 9 is arranged; suitable bolts 10 being passed through the cover, gasket, and flange, to assure an air-tight joint at this point, and in order that the cover may be easily removed from the casing proper, the cover, gasket and flange of the casing are slotted, as at 11, thus permitting the bolts to be slipped out of place when the nuts thereof are slightly loosened.

A distance above the bottom wall 5 of the casing, a horizontal partition 12 is provided, and extending upwardly from this partition to the top of the casing, is a vertical partition or wall 13, which divides the space above the horizontal partition 12 into two filtering compartments or chambers 14, 15, termed, respectively, the primary and secondary filtering compartments or chambers.

The vertical wall or partition may be snugly fitted between two opposite side walls of the casing, and it is secured at its lower end to the horizontal wall or partition 12. If desired, the vertical wall may also be secured to opposite side walls, against which the edges thereof are shown as bearing.

That portion of the horizontal partition which closes the bottom of the primary filtering chamber 14 is perforated, or otherwise may be made foraminous, as at 16, or it may, of course, be formed of wire mesh. The portion of the horizontal partition serving as the bottom of the secondary filtering compartment or chamber 15 is left imperforate.

Within each of the filtering chambers 14, 15, the filtering medium extends downwardly from a plane a distance from the cover to the horizontal wall or partition 12 so as to provide a pressure chamber 17 at the upper end of the primary filtering chamber 14 and a similar pressure chamber 18 at the upper end of the secondary filtering chamber 15.

As the filtering medium I employ natural sponge 19, and camels hair 20 arranged in alternate layers or sections, the layers of camels hair being thin as compared to the layers or sections of sponges.

In a small size filter a single sponge may serve to form a complete layer or section. Where, however, filters are made of larger size, numerous sponges may be found necessary to form a layer or section.

For a small filter, such as used in automobiles for filtering oil under pressure, the use of a single sponge to form a spongy layer or section, alternated with thin layers of camels hair, assure an exceedingly convenient and simplified form of filter which can be easily cleansed, and on account of its simplicity and convenience in cleansing the same, will enable the user to regularly remove the filtering medium from the casing. The sponges and camels hair can therefore be easily cleansed by submerging them into gasoline after driving the automobile a predetermined number of miles; thus assurance can be had of the oil being used in its purest form, which, of course, is highly desirable to properly lubricate the automobile and preserve the life of the parts lubricated.

Entering the primary filtering chamber 14 at its upper end, and more particularly the pressure chamber 17 at the upper end of said filtering chamber, is an inlet pipe 21 through which oil is delivered under pressure. This inlet pipe has a nozzle 22 of any suitable form or construction at its inner terminal, which is disposed centrally over the filtering medium and may discharge the oil under pressure in several streams so that the oil is well distributed over the top of the filtering medium and will be forced through all portions of the same under pressure, aided by gravity. While distribution or spreading of the oil in this manner is not absolutely necessary, it is considered highly desirable.

The inlet pipe 21 has, what may be termed, a nozzle section 23 which is passed through a wall of the casing, preferably one of the side walls, and to it a supply section 24 is connected by means of a union 25. The nozzle section 23 of the inlet pipe is screw-threaded inwardly from its outer end so that one portion of the union 25 may be threaded thereon, and so that the pipe may be threaded into the wall of the casing, the arrangement being such that the pipe is threaded into said wall from the interior of the casing, and it has a clamp nut 26 threaded thereon, between which and the wall of the casing, a gasket 27 is interposed, the gasket being compressed against said wall and around said pipe when tightening said clamp nut, thus preventing the escape of air or oil along the pipe. This arrangement also provides a simple and convenient means for removing the pipe when it is desired to remove the filtering medium. However, since the pipe and nozzle occupy comparatively little space, it may be found unnecessary to remove them, as the sponge elements and camels hair can be condensed in area and moved to one side so as to be drawn upwardly along the side of the nozzle and inlet pipe. However, in very small filters it may be found difficult to remove the filtering medium without removing the nozzle and its supporting pipe.

The space between the horizontal partition 12 and the bottom wall 5 is utilized as an oil chamber or oil transfer chamber and as a sediment chamber, and this space or chamber is designated by the numeral 28. A pipe 29 threaded into and extending upwardly from said horizontal partition opens at its lower end into said transfer or sediment chamber and this pipe I term a transfer pipe. This pipe has a recurved or gooseneck portion 30 at its upper end, which is connected to a distributing nozzle 31 disposed centrally over the filtering medium in the filtering chamber 15 and serves to discharge the oil under pressure in several streams so that it will be well distributed over the top of the filtering medium, the same as the nozzle 22 in the filtering chamber 14; the oil being forced under pressure, aided by gravity, through all portions of the filtering medium within the filtering chamber 15, and the oil passing through the filtering medium escapes at the bottom of said filter chamber through an outlet pipe 32 which returns it to the source from whence it was delivered into the filter to be returned to the filter in case of application of the filter to an automobile. In some other instances the filter may be utilized to filter the oil under gravity or pressure, and the oil, after being filtered, may be delivered through the outlet or delivery pipe 32 to a place of storage for future use.

The transfer pipe 29 extends upwardly through the several layers or sections of sponge and camels hair packed within the filtering chamber 15, and in the event of the filter being made small and a single sponge being utilized to form one section or layer, the sponge is split, as at 33, Fig. 2, so that it can be conveniently positioned around the transfer pipe.

The operation of the device is as follows:

The oil enters the pipe 21 and escapes from the nozzle 22 and, if fed under gravity, passes down through the successive layer of sponges and the intervening layers of camels hair, and escapes through the perforated portion of the horizontal wall 12 so as to enter the transfer or sediment chamber 28. When this chamber is filled with oil and the oil in the filter chamber 14 reaches a level above the recurved or gooseneck portion 30 of the transfer pipe 29, it escapes out through the nozzle 31, and under gravity passes down through the successive layers of sponges and intervening layers of camels hair until it reaches the bottom of the filter chamber, where it escapes out through the outlet pipe 32.

When, however, oil is introduced through the filter under pressure, pressure is maintained within the entire filtering device, and especially in the pressure chambers 17 and 18 at the upper ends of the filtering chambers 14 and 15, respectively. The oil is forced under pressure, assisted by gravity, downwardly through the filtering medium in the filtering chamber 14, and escapes through the perforated portion of the horizontal wall 12 so as to enter the transfer chamber 28. When the oil within the transfer chamber reaches the bottom of the transfer pipe 29, pressure applied to the body of oil in the transfer chamber from above will force the oil upwardly through said pipe so as to escape under pressure from the distributing nozzle 31, the pressure in the pressure chamber 18 forcing the oil downwardly, aided by gravity, through the successive sponge layers and intervening layers of camels hair, and at the bottom of the filtering chamber 15, the oil escapes out through the delivery pipe 32. The sponges and camels hair in the filtering chamber 14 may be somewhat coarser than like elements or substances in the filtering chamber 15.

The layers of sponges and camels hair are well compressed so that they tend to expand in a horizontal direction firmly against the surrounding wall of the chambers in which they are located, thus preventing the passage of oil along the sides of the layers.

The oil after having passed through the filtering medium in the primary filtering chamber 14 is fairly well freed of foreign matter and after passing to the bottom of the filtering medium in the supplemental filtering chamber 15, will be freed of all foreign matter. Any sediment retained in the oil after reaching the transfer or sediment chamber 28 will lodge on the bottom of the casing, and as this bottom slopes to the drain opening or pet cock 6, the sediment may be easily drained. The sediment in the transfer or sediment chamber will not rise to the top of the oil within said chamber, due to the fact that the oil is not, at any time, agitated or disturbed, it being a quiet body under pressure, due to the fact that pressure is directed against the same underneath the perforated portion of the horizontal partition 12 and upwardly underneath the region of the imperforate portion of said horizontal partition. Consequently, the oil is forced under pressure through the transfer pipe 29 as no other opening is provided within the transfer or sediment chamber for the passage or escape of oil therethrough.

It is apparent that certain features of my invention may be employed without retaining all the features thereof, and for this reason filtering mediums other than sponges and camels hair may be utilized without departing from the spirit of my invention, or sacrificing advantages possessed by other parts thereof. I have, however, found by experiments, that more effective filtering of oil is assured by the use of sponges and camels hair, and therefore my invention possesses special advantages when using all of the elements shown and described herein.

Having thus described my invention, what I claim is:

1. An oil filter, comprising a casing having a bottom wall, a partition spaced from said bottom wall to provide a transfer chamber between said bottom wall and said partition, a vertical partition dividing the space above said horizontal wall into a primary filtering chamber and a secondary filtering chamber, said horizontal wall being provided with perforations at the bottom of said primary filtering chamber, an inlet pipe entering said primary filtering chamber, a pipe extending upwardly through said secondary filtering chamber and opening into said transfer chamber, one of the terminals of each of said pipes being spaced from said horizontal partition, a filtering medium in each of said filtering chambers between said terminals and said horizontal partition, and an outlet pipe at a low point of said secondary filtering chamber.

2. An oil filter, comprising a casing having a bottom, a horizontal partition spaced from said bottom and a vertical partition dividing the space above said horizontal partition into a primary filtering chamber and a secondary filtering chamber, said horizontal partition being provided with means at the bottom of said primary filtering chamber allowing the passage of oil therethrough, an inlet pipe entering said casing and having a nozzle at its inner end, a transfer pipe extending upwardly from said horizontal partition and opening at its lower end into said transfer chamber, said transfer pipe having a recurved upper portion and a nozzle secured to said upper portion, said nozzle being spaced from said horizontal partition, an outlet pipe connected to said secondary filtering chamber at a low point, and layers of natural sponges and camels hair alternately arranged and compressed within each of said filtering chambers and receiving support from said horizontal partition, said transfer pipe extending upwardly through the sponges and camels hair in said secondary filtering chamber.

3. An oil filter, comprising a casing having a plurality of filtering chambers provided with a filtering medium, adjacent chambers having foraminous and solid bottoms, respectively, a chamber underneath said filtering chambers, filtering mediums in said filtering chambers supported, respectively, by the foraminous and solid bottoms of said chambers, means for feeding oil into the filtering chamber having the foraminous bottom at a point above the filtering medium therein, means for providing conduit connection between the space above the filtering medium in the filtering chamber having the solid bottom and the chamber underneath said filtering chamber, and an outlet at a low point of the filtering chamber having the solid bottom.

4. An oil filter, comprising a casing having two filtering chambers arranged side by side and provided with filtering material through which oil is filtered, means for delivering oil to one of said filtering chambers, a transfer chamber beneath said filtering chambers into which oil is delivered from said last-mentioned filtering chamber, means for conveying oil from said transfer chamber to the top of the other filtering chamber to permit the partly filtered oil to be completely filtered by passage through the filtering material in said other filtering chamber, and means for delivering the completely filtered oil from the lower end of said last-mentioned filtering chamber.

5. An oil filter, comprising a casing having two filtering chambers separated by a wall and provided with filtering material through which oil is filtered, means for delivering oil under pressure into the upper end of one of said filtering chambers, a transfer chamber into which oil is delivered under pressure from said last-mentioned filtering chamber, means for conveying oil under pressure from said transfer chamber to the other filtering chamber to permit the partly filtered oil to be completely filtered by passage through the filtering material in said other filtering chamber, and means for delivering the completely filtered oil from the lower end of said other filtering chamber.

OLIVER TEATRIC McKEAN.